United States Patent [19]
Horovitz

[11] Patent Number: 5,118,555
[45] Date of Patent: * Jun. 2, 1992

[54] COMPOSITE ARTICLE

[76] Inventor: Zvi Horovitz, 21 Marie Dr., Andover, Mass. 01810

[ * ] Notice: The portion of the term of this patent subsequent to Apr. 10, 2007 has been disclaimed.

[21] Appl. No.: 421,253

[22] Filed: Oct. 13, 1989

Related U.S. Application Data

[63] Continuation-in-part of Ser. No. 350,304, May 11, 1989, Pat. No. 4,914,836.

[51] Int. Cl.$^5$ .......................... B32B 1/00; D04B 7/04
[52] U.S. Cl. .................................. 428/178; 428/119; 428/120; 428/156; 428/158; 428/160; 428/166; 428/172; 428/174; 428/188; 428/225; 428/245; 428/284; 428/289; 428/290; 428/304.403; 428/308.4; 36/28; 36/44; 139/384 R; 139/387 R; 139/390; 66/196
[58] Field of Search ............... 428/178, 166, 188, 101, 428/119, 120, 156, 174, 96, 158, 160, 225, 245, 260; 66/196; 36/28, 29, 44; 139/384 R, 390, 387 R

[56] References Cited

U.S. PATENT DOCUMENTS

| 3,530,021 | 9/1970 | Reichl | 428/188 |
| 4,132,577 | 1/1979 | Wintermantel | 428/188 |
| 4,837,060 | 6/1989 | Bambara | 428/178 |
| 4,914,836 | 4/1990 | Horovitz | 428/178 |

Primary Examiner—Ellis P. Robinson
Assistant Examiner—Donald J. Loney
Attorney, Agent, or Firm—Edward A. Gordon

[57] ABSTRACT

The invention relates to a composite structure including a plurality of fabric layers of interlaced flexible stretch-resistant strand material impregnated with a rigid resinous material and positioned in spaced generally parallel relationship to each other. A plurality of elongated partitions are disposed between adjacent layers and divide the space between adjacent layers into a plurality of elongated generally parallel channels. The partitions each comprise a plurality of stretch-resistant strand material interlaced with adjacent layers in a plane generally perpendicular to the adjacent fabric layers and are also impregnated with a rigid resinous material. In one embodiment, a rigid foamed material can be disposed in the channels for particular applications. A preferred method of making the rigid composite structure is also presented.

13 Claims, 2 Drawing Sheets

COMPOSITE ARTICLE

This application is a continuation-in-part of application Ser. No. 350,304 filed 11 May 1989 now U.S. Pat. No. 4,914,836.

BACKGROUND OF THE INVENTION

1. Field Of The Invention

The present invention relates to composite articles formed from interlaced stretch-resistant flexible strand material impregnated with a rigid material and to the method of making such articles.

2. Description Of Prior Art

Typical prior art composite articles generally comprise a honeycomb sandwich construction having a honeycomb core formed of a metal foil such as aluminum or aluminum alloys laminated between a pair of inner adhesive sheets and outer face sheets. Such laminated sandwich structures have the disadvantage of being subject to delamination when subjected to interlaminar stresses such as shear or tensile stresses. Delamination results in weakening of such laminate structures.

Accordingly, a principal desirable object of the present invention is to provide a new and improved composite article of manufacture which overcomes the disadvantages of the prior art comprising layers of interlaced stretch-resistant flexible strand material impregnated with a rigid cured thermosetting resinous material and held in spaced relation from each other by a plurality of partitions disposed between the layers and dividing the space between the layers into a plurality of channels, the partitions being formed of stretch-resistant strand material impregnated with the same rigid resinous material.

Another desirable object of the present invention is to provide an article of manufacture having a high strength to weight ratio and improved compression loading.

Another desirable object of the present invention is to provide an article of manufacture having a high damage tolerance.

Another desirable object of the present invention is to provide a composite structure having improved resistance to shear and tensile stresses.

Another desirable object of the present invention is to provide a composite structure which is readily adaptable to form an integral part of articles which require high strength to weight ratios.

Another desirable object of the present invention is to provide a new and improved method of producing such articles of manufacture.

A still further desirable object of the present invention is to achieve the above desirable objects with an essentially simple structure, lending itself to inexpensive mass-production.

These and other desirable objects of the invention will in part appear hereinafter and will in part become apparent after consideration of the specification with reference to the accompanying drawings and the claims.

SUMMARY OF THE INVENTION

In accordance with the present invention a composite structure means having high strength to weight ratio and improved damage tolerance and which can be formed to selected configurations is provided which is, for example, useful in the fabrication of articles for aircraft, spacecraft, seacraft, sporting equipment, automotive and, packaging and insulation materials. The composite structure of the present invention generally envisions at least a double plush-like mesh structure having at least first and second layers (or a plurality of layers) of interlaced stretch-resistant flexible strand material positioned adjacent each other, and defining an intermediate space between the adjacent first layer and second strand layers. A plurality of elongated interlaced partitions are disposed between the first and second strand layers and divide the intermediate space between adjacent strand layers into a plurality of elongated generally parallel channels. The partitions each comprise a plurality of pile stretch-resistant strand material interlaced with the first and second layers in a plane generally perpendicular to the first and second layers. The channels formed by the linking of the first and second layers by the pile partition strands have a generally rectilinear configuration. Resiliently-compressible single cell fluid-impermeable tubular members are disposed or integrated during fabrication within all or at least a majority of the channels and adaptable to be inflated under fluid pressure to within the confining limits of the channel walls, which are each defined by adjacent strand partitions and the portions of the first and second strand layers within the adjacent partitions. The layers of interlaced stretch-resistant strand material forming the partitions are impregnated with a thermosetting resinous material which is curable to form a hard rigid structure. The invention contemplates embodiments wherein the tubular members may be removed or may be thermosealed to the channel structures depending upon the use of the composite structure as discussed in more detail herein. The invention also contemplates a multilayered structure.

As briefly stated the preferred process of making the rigid composite structure of the present invention comprises the steps of: forming at least a double plush interlaced structure having adjacent spaced layers of interlaced flexible stretch-resistant strand material and a plurality of elongated partitions disposed between said adjacent layers and dividing the space between adjacent layers into a plurality of elongated generally parallel channels; the partitions each comprising a plurality of stretch-resistant strand material interlaced with adjacent strand layers in a plane generally perpendicular to the spaced adjacent strand layers; integrating during fabrication inflatable tubular members into the channels; impregnating the interlaced layers and partitions with a thermosetting resinous substance; inflating the tubular members to the confining limits of the containing channels while subjecting the composite structure to sufficient pressure so as to form a matrix of the resinous substance about the strand material, removing excess resinous material; and heating the composite structure to the thermosetting temperature of the resinous material to cure the same and form a rigid matrix of the interlaced strand material and cured thermosetting resinous material. The tubular members may then be removed or sealed to the structure channels. The channels or open sealed tubular members can be filled with a stiff or rigid foam material for particular applications of the composite structure. In an alternate process where a relatively small composite structure is to be formed, the process is carried out in a pressure vessel so that a high pressure is employed during the sealing of the ends of the tubular members and thereafter during the impregnation of the resin whereby the tubular members are in a relatively collapsed state during sealing and impregnation and thereafter the pressure is sufficiently reduced prior to the resin curing process whereby the tubular members are expanded to the confining limits of the channels in which they are positioned to form an erect composite structure.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein.

DESCRIPTION OF PREFERRED EMBODIMENT(S)

Figure 1:
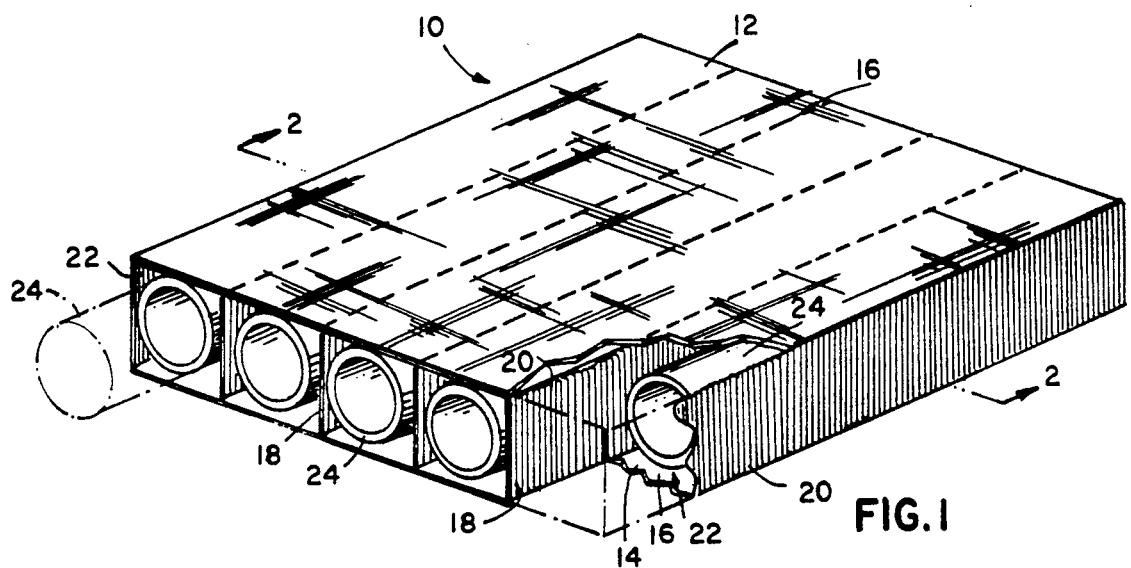
FIG. 1 is a fragmentary perspective view illustrating a structure embodying the principals of the present invention.
Figure 2:
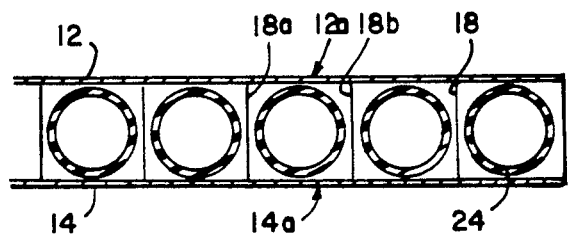
FIG. 2 is a cross-sectional view taken along the line 2—2 of FIG. 1.

Referring now to the drawings and particularly to FIGS. 1 and 2, there is shown an embodiment of the basic structure means embodying the principals of the present invention. As illustrated, the structure, indicated generally by the numeral 10, comprises a double plush mesh construction having a first or upper fabric layer 12 and a second or lower fabric layer 14, each formed of interlaced stretch-resistant flexible strand material 16. A plurality of elongated partitions or piles 18 formed of stretch-resistant strand material 20 are provided which connect or interlace with the first and second strand layers in a plane generally perpendicular to the planes of the first and second strand layers 12 and 14 respectively. Adjacent partitions (for example 18a and 18b of FIG. 2) together with the portions 12a of the upper layer 12 and 14a of the lower layer 14 between the partitions 18a and 18b each have a generally rectilinear configuration and form elongated channels or pipes 22 having a generally square or rectangular shape.

Suitable materials for forming the strand layers 12 and 14 and the strand partitions or perpendicular piles 18 are stretch-resistant or fully drawn materials such as polyesters, nylon, polypropylene, polyethylene, fiberglass, carbon velvar, ceramics and the like. Additionally, conventional processes (and equipment therefor) such as weaving and knitting can be employed to form the intimate interlaced unified structure 10 of the present invention.

Figure 3:
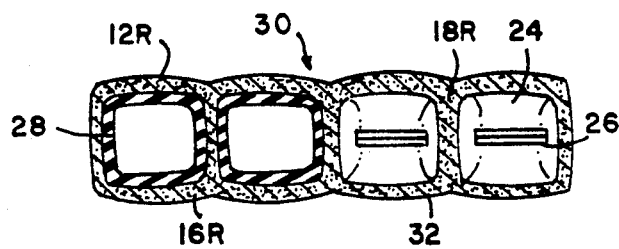
FIG. 3 is a cross-sectional view of a structure similar to that of FIG. with the structure impregnated with a resinous material and further illustrating the tubular members in an inflated condition under fluid pressure and also showing the sealed ends of two of the tubular members.

There are disposed or inserted into the chambers 22, during the fabrication process, flexible, expandable, fluid impermeable tubular members 24. The tubular members can, for example, be formed of a heat sealable elastomer which is impermeable to gaseous fluids. In a preferred embodiment the thickness of the tubular wall is selected in relation to the material forming the tubular member so that the tubular member is expandable to the confining limits of the channels 22 (as best seen in FIG. 3) to maintain the structure in the erected or non-contracted condition during resination of the layers and partitions.

While it is not essential that tubular members be provided for all channels, which in part may be determined by the use of the structure and the level of action to be encountered, it is preferable that at least a majority of the chambers be filled with the tubular members.

In the case where the tubular members are to be maintained in an inflated condition after the resinous material is cured, the gaseous fluids which can be employed to fill the pressurized tubular members 24 of the structure 10 should preferably be a gas which will not diffuse appreciably through the walls of the tubular member material.

The two most desirable gases have been found to be hexafluorethane (e.g., Freon F-116) and sulfur hexafluoride.

Other gases which have been found to be acceptable, although not as good as hexafluorethane and sulfur hexafluoride, are as follows: perfluoropropane, perfluorobutane, perfluoropentane, perfluorohexane, perfluoroheptane, perfluorocyclobutane, octafluorocyclobutane, hexafluoropropylene, tetrafluoromethane (e.g., Freon F-14), monochloropentafluoroethane (e.g., Freon F-115), and other Freon gases known as Freon 114, Freon 113, Freon 13 B-1, and Freon 13. It is to be understood that while the foregoing gases are preferred, other gases such as air, oxygen, nitrogen and mixtures of such gases can be employed.

Referring more particularly to FIG. 3, the structure indicated generally by the numeral 30 includes the basic structure 10 of FIG. 1 and further shows the tubular members 24 in the sealed and inflated pressurized state. Each end of the tubular members is sealed as shown at 26 to form a single cell fluid-impermeable member 24. Additionally, as mentioned herein, the elasticity of the tubular members 24 is selected including the thickness of the tubular wall 28 so that when the tubular member is sufficiently inflated under gaseous pressure or under vacuum it expands sufficiently and conforms generally to the shape of the channel walls to maintain the structure in a straight, erect, non-collapsed configuration. The structure (first and second layers and partitions) is then impregnated with a thermosetting resinous substance 32 to form a composite layer of the resin and strand material indicated respectively by the numerals 12R, 16R and 18R in FIG. 3. A suitable thermosetting resin can, for example, be an epoxy resin.

One advantage of the inflated and pressurized tubular members 24 in the process of forming the composite structure of the present invention is that the resin material is removed or forced out of the channels whereby the channels are substantially relatively free of resin prior to and during the resin curing process step. This step provides for a composite structure having a relatively low resin to strand material ratio as well as a higher strength to weight ratio.

Figure 4:
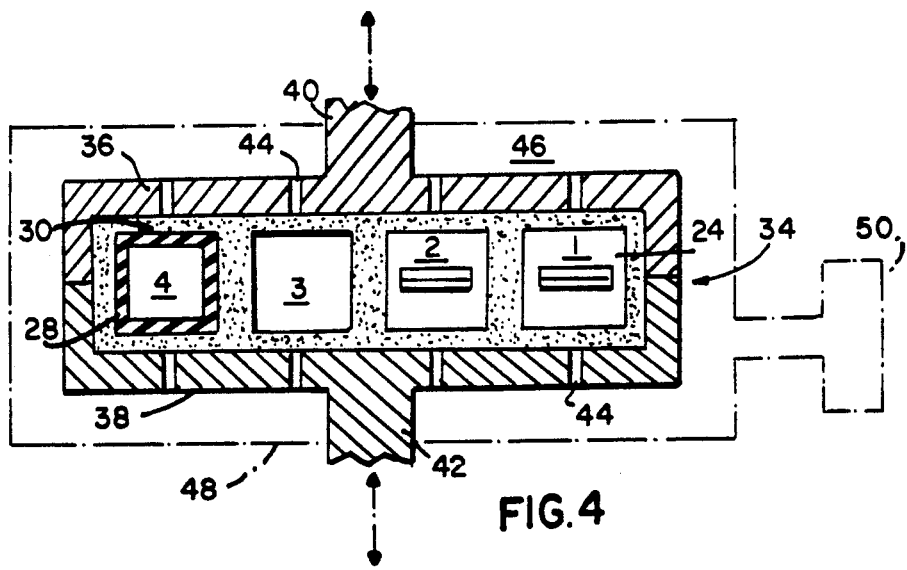
FIG. 4 is a schematic representation of the structure of FIG. 3 and further illustrating one embodiment of the process of curing the resinous material while maintaining a desired configuration of the structure.

Referring now to FIG. 4, there is illustrated a preferred method of curing the resin impregnated structure. As shown, the resin impregnated and inflated structure 30 of FIG. 3, for example, is inserted into a tool member indicated generally by the numeral 34 having a pair of holding members 36 and 38 which are movable by arm members 40 and 42. The composite structure holding members 36 and 38 are provided with a plurality of apertures 44 which permit the composite structure to be subjected to positive and negative ambient pressure values. The tool member 34 containing the composite structure 30 is placed within the chamber 46 of the metal vessel 48 (represented by the dotted lines). The vessel 48 is provided with conventional means 50 which can serve to heat the chamber in addition to providing selected positive or negative pressure values within the chamber 46. The composite structure 30 is maintained at an appropriate temperature to effect curing of the resinous material and to form a hard matrix of the cured thermosetting resinous substance converting the interlaced strand layers and partitions to a hard, light weight, rigid structure.

In preparing the composite structure for subsequent use in forming selected articles, the tubular members can be; a) retained in the channels and pressurized as shown in channels 1 and 2 of FIG. 4; b) removed as shown in channel 3 (by melting or dissolving, for example); or c) laminated by thermosealing to the channel walls as shown in channel 4. It is to be understood that the invention contemplates the insertion of a stiff or rigid foam material in structures b and c where such foamed material enhances the use of the structure.

As an alternate method of forming the composite structure, the ends 26 of the tubular members 24 can be sealed under positive gas pressure within the vessel 48. The apertures 44 provide and insure that the composite structure 30 and contained tubular members are subjected to such external pressure. Thereafter the resin impregnated structure 30 is subjected to sufficient vacuum or negative gas pressure to expand the tubular members to the confining limits of the channel as discussed herein. Thereafter the resin curing process and disposition of the tubular members is carried out as described herein.

Figure 5:
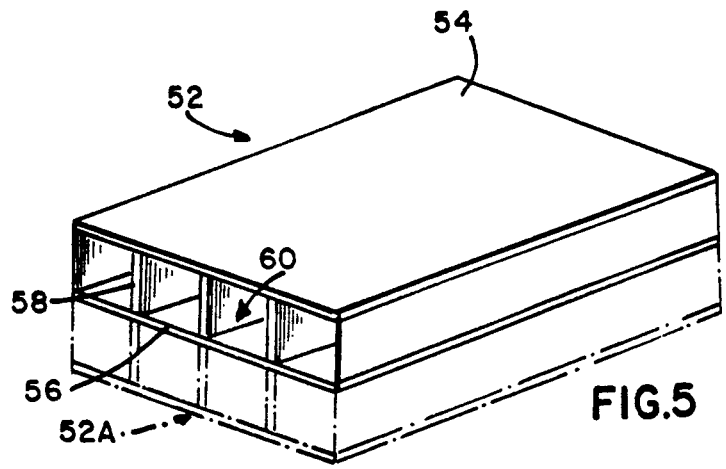
FIG. 5 is a perspective view of the cured rigid composite structure of FIG. 4 and additionally illustrates a multilayered or laminated composite as shown by the dotted lines.

Referring now to FIG. 5, there is illustrated a cured resinous composite structure 52 similar to the structure 30 of FIGS. 3 and 4 but with the tubular members removed. The composite structure 52 includes first and second layers 54 and 56, partitions 58 and channels 60. A second structure 52A shown by the dotted lines can be laminated to structure 52 to form a multilayered composite structure. In this respect, it is to be understood that in the initial formation of the interlaced structure of the present invention a triple plush or multi-layer structure can be formed as well as the double plush structure.

Figure 6B:
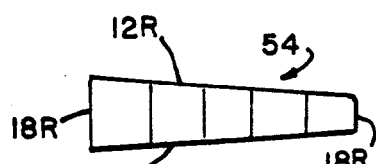
FIG. 6, A, B and C, schematically illustrate examples of alternate configurations of the structure embodying the principals of the present invention.
Figure 6C:
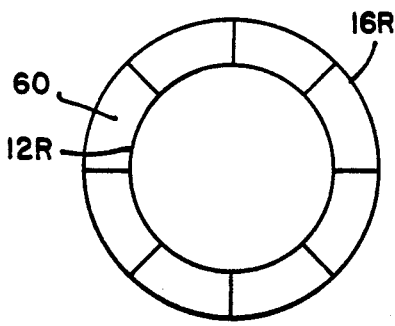
Figure 6A:
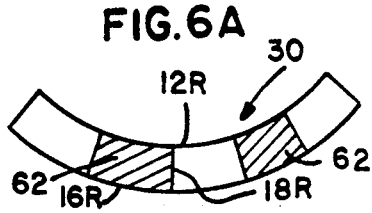

As illustrated in FIGS. 6A, 6B, and 6C the structure 30 can be formed into various three dimensional configurations such as the curved configuration shown at 6A. The curved configuration can be provided by providing a curved tool member 34 for the resin curing step. As shown at 6B the structure 54 is provided with an overall tapered configuration by decreasing the height of the partitions 18R. In the circular configuration shown at 6C the length of the inner layer 12R is fabricated to be shorter than the length of the outer layer 16R so as to form the circular configuration. The present invention also contemplates the filling of one or more of the channels with a stiff or rigid forming foam material 62 as shown in FIG. 6A which can be polyurethane or other foam material. The foam material provides added strength as well as increased overall volume to the structure with minimum weight increase thereby increasing the buoyancy feature of the structure which renders the structure suitable in the construction of water craft.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A composite structure having a high strength to weight ratio and providing improved resistance to delamination, said composite structure comprising:
   a plurality of fabric layers of interlaced flexible stretch-resistant strand material; said fabric layers each being impregnated with a thermosetting rigid forming material; said fabric layers being positioned in spaced generally parallel relationship to each other; and
   a plurality of elongated partitions disposed between adjacent fabric layers and dividing the space between adjacent fabric layers into a plurality of elongated generally parallel channels;
   said partitions each comprising a plurality of stretch-resistant strand material interlaced with adjacent fabric layers in a plane generally perpendicular to said adjacent fabric layers, each of said partitions being impregnated with a thermosetting rigid forming material.

2. The composite structure of claim 1 wherein said rigid material is a cured thermosetting resinous substance.

3. The composite structure of claim 1 wherein at least a majority of said channels contain a foamed material.

4. The composite structure of claim 3 wherein the foamed material is polyurethane.

5. The composite structure of claim 1 wherein tubular members are contained within at least a majority of said channels.

6. The composite structure of claim 1 having a generally tapered configuration.

7. The composite structure of claim 1 having a generally circular configuration.

8. A rigid composite structure comprising:
   a first layer of interlaced flexible stretch-resistant strand material impregnated with a thermosetting rigid forming material;
   a second layer of interlaced stretch-resistant flexible strand material impregnated with a thermosetting rigid forming material and positioned adjacent said first layer and defining an intermediate space between said first layer and said second layer; and
   a plurality of elongated partitions disposed between said first and second layers and dividing said intermediate space into a plurality of elongated generally parallel channels;
   said partitions each comprising a plurality of stretch-resistant strand material interlaced with said first and second layers in a plane generally perpendicular to said first and second layers, said partitions being impregnated with a thermosetting rigid forming material.

9. The rigid composite structure of claim 8 wherein said rigid material is a cured thermosetting resinous material.

10. The rigid composite structure of claim 8 wherein said channels contain a foamed material.

11. The rigid composite structure of claim 8 wherein tubular members are contained within said channel members.

12. The rigid composite structure of claim 8 wherein at least a portion of the configuration of the composite structure is non-linear.

13. The rigid composite structure of claim 8 wherein the second layer of interlaced stretch-resistant strand material is shorter than the first layer and forms the inner layer of a composite structure having a circular configuration.

* * * * *